(12) United States Patent
Choudhury et al.

(10) Patent No.: US 12,316,270 B2
(45) Date of Patent: May 27, 2025

(54) SOLAR AXIS TRACKING SYSTEM FOR PORTABLE CONTAINER UNIT WITH RETRACTABLE PHOTOVOLTAIC SOLAR PANELS

(71) Applicants: Amit Choudhury, Grand Cayman (KY); Jody Bhagat, Los Altos, CA (US)

(72) Inventors: Amit Choudhury, Grand Cayman (KY); Jody Bhagat, Los Altos, CA (US)

( * ) Notice: Subject to any disclaimer, the term of this patent is extended or adjusted under 35 U.S.C. 154(b) by 0 days.

(21) Appl. No.: 18/138,121

(22) Filed: Apr. 23, 2023

(65) Prior Publication Data

US 2023/0378903 A1    Nov. 23, 2023

Related U.S. Application Data

(60) Provisional application No. 63/334,128, filed on Apr. 23, 2022, provisional application No. 63/334,660, filed on Apr. 25, 2022, provisional application No. 63/461,323, filed on Apr. 23, 2023.

(51) Int. Cl.
| | |
|---|---|
| *H02S 20/32* | (2014.01) |
| *H02S 30/10* | (2014.01) |
| *H02S 40/34* | (2014.01) |
| *H02S 40/38* | (2014.01) |

(52) U.S. Cl.
CPC .............. *H02S 20/32* (2014.12); *H02S 30/10* (2014.12); *H02S 40/34* (2014.12); *H02S 40/38* (2014.12)

(58) Field of Classification Search
CPC .......... H02S 20/32; H02S 30/10; H02S 40/34; H02S 40/38; H02S 10/40; H02S 20/20; H02S 30/20
See application file for complete search history.

(56) References Cited

U.S. PATENT DOCUMENTS

| | | | |
|---|---|---|---|
| 11,108,353 B1 * | 8/2021 | Morse ..................... | G01J 1/42 |
| 2011/0146751 A1 * | 6/2011 | McGuire ................. | F03D 9/007 |
| | | | 136/245 |
| 2016/0352285 A1 * | 12/2016 | Seery ...................... | H02S 10/40 |

* cited by examiner

*Primary Examiner* — Michael Y Sun

(57) ABSTRACT

A solar panel container unit comprising: one or more photovoltaic (PV) solar arrays each comprising a photovoltaic solar panel, and wherein the PV solar panel comprises a plurality of solar cells which generate electric power, wherein the PV solar arrays are less than 5 mm in thickness and have no metal frames and no protective glass; a local power source; a plurality of actuator that move the one or more photovoltaic (PV) solar arrays; an Axis Tracking System that: establishes three points for each day for the axis tracking system algorithm; uses parameter for an n-number of desired increments between the Start Point and the High Point, and m-number of desired increments between the High Point and the End Point; calculates the angle for each solar array so each solar array is as close to an angle of incidence of ninety-degrees (90°) each time the plurality of actuators moves each solar array, feeds angle calculations into plurality of actuators.

19 Claims, 20 Drawing Sheets

200

600

1000

1100

1200

1300

1700

SOLAR AXIS TRACKING SYSTEM FOR PORTABLE CONTAINER UNIT WITH RETRACTABLE PHOTOVOLTAIC SOLAR PANELS

CLAIM OF PRIORITY

This patent application claims priority to U.S. Provisional Patent Application No. 63/334,128, filed on 23 Apr. 2022 and titled CONTAINER UNIT WITH RAPIDLY DEPLOYABLE INTEGRATED RETRACTABLE PHOTOVOLTAIC SOLAR PANELS, BATTERIES, CONTROLLER AND ENERGY YIELD MANAGEMENT SOFTWARE. This provisional patent application is hereby incorporated by reference in its entirety.

This patent application claims priority to U.S. Provisional Patent Application No. 63/334,660, filed on 25 Apr. 2022 and titled CONTAINER UNIT WITH RAPIDLY DEPLOYABLE INTEGRATED RETRACTABLE PHOTOVOLTAIC SOLAR PANELS, BATTERIES, CONTROLLER AND ENERGY YIELD MANAGEMENT SOFTWARE. This provisional patent application is hereby incorporated by reference in its entirety.

This patent application claims priority to U.S. Provisional Patent Application No. 63/461,323, filed on 23 Apr. 2023 and titled CONTAINER UNIT WITH RAPIDLY DEPLOYABLE INTEGRATED RETRACTABLE PHOTOVOLTAIC SOLAR PANELS, BATTERIES, CONTROLLER AND ENERGY YIELD MANAGEMENT SOFTWARE. This provisional patent application is hereby incorporated by reference in its entirety.

FIELD OF INVENTION

This invention is related to solar energy systems, and more specifically for a solar axis tracking system for a container unit with retractable photovoltaic solar panels.

BACKGROUND

The concept of using a container as a source of energy, by being the supporting structure for solar panels, enclosing some form of a battery energy storage system, and potentially adding the intelligence to control the energy flow using a device such as a programmable logic controller ("PLC") has been in the market for more than 20 years.

In almost all cases, the product consists of a container shaped box, with a rigid metal super-structure mounted on top of the container which holds the solar panels in place. To set up the system requires manually mounting the super-structure and the solar panels, after the container has been delivered to its operational location. Moving the container requires disassembly of the super structure, storing the solar panels and only then moving the container to the new location. These products and solutions have almost always used traditional solar panels which have a metal frame and are encased in tempered glass, therefore being both heavy and cumbersome. More importantly, the glass or frame can break exposing the solar cells to water and wind causing an electrical short and killing the system.

Solar panels placed on the rooftop of a structure or container are automatically active when the Sun shines. In one example, a solar panel system can be placed on a dual-axle trailer, so it can be towed by a truck from location to location. However, being a trailer, weight can be a serious issue.

Solar arrays and their modules produce the most amount of energy when the angle of incidence between the Sun and the solar module can be perpendicular i.e., 90 degrees. Over the course of a day, the Sun moves in an arc from morning to evening. The position and shape of this arc changes over the course of each year, due to the position of the location on Earth relative to the Sun. At the same time, a stand-alone solar system may not be connected to an external power source to power the axis tracking system. Constant movement of the actuators can decrease the battery power supply. Accordingly, improvements are desired that enable a solar axis tracking system to move each of the solar arrays over the course of each day to optimize the amount of energy produced.

BRIEF SUMMARY OF THE INVENTION

A solar panel container unit comprising: one or more photovoltaic (PV) solar arrays each comprising a photovoltaic solar panel, and wherein the PV solar panel comprises a plurality of solar cells which generate electric power, wherein the PV solar arrays are less than 5 mm in thickness and have no metal frames and no protective glass; a local power source; a plurality of actuator that move the one or more photovoltaic (PV) solar arrays; an Axis Tracking System that: establishes three points for each day for the axis tracking system algorithm; uses a parameter for an n-number of desired increments between the Start Point and the High Point, and an m-number of desired increments between the High Point and the End Point; calculates the angle for each solar array so each solar array is as close to an angle of incidence of ninety-degrees (90°) each time the plurality of actuators moves each solar array, feeds the angle calculations into the plurality of actuators; recalculates the angle calculations n-number of times in a morning time; and recalculates m-number of times at an afternoon time for each day of operation across the entire year.

BRIEF DESCRIPTION OF THE DRAWINGS

The present application can be best understood by reference to the following description taken in conjunction with the accompanying figures, in which like parts may be referred to by like numerals.

Figure 1:
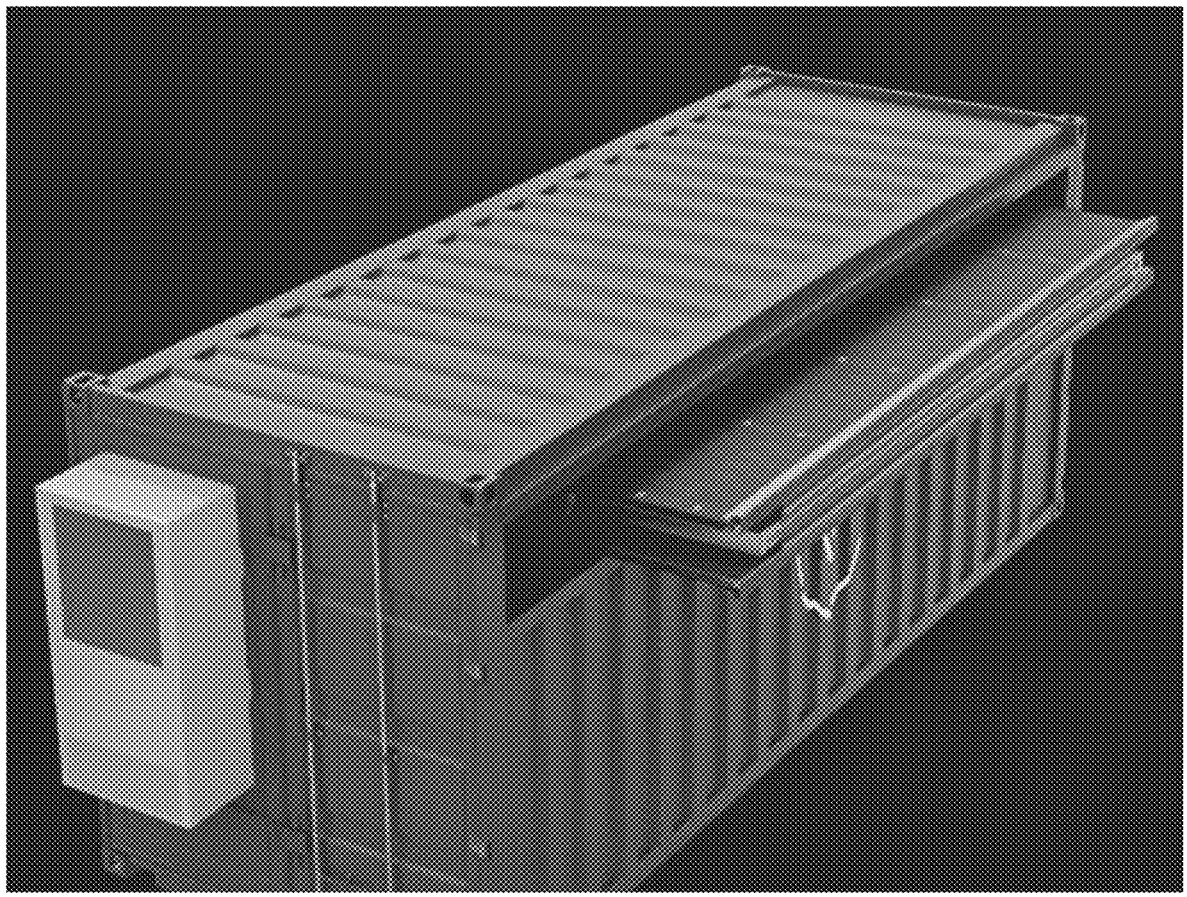
FIGS. 1-8 illustrates an example solar panel container unit, according to some embodiments.
Figure 2:
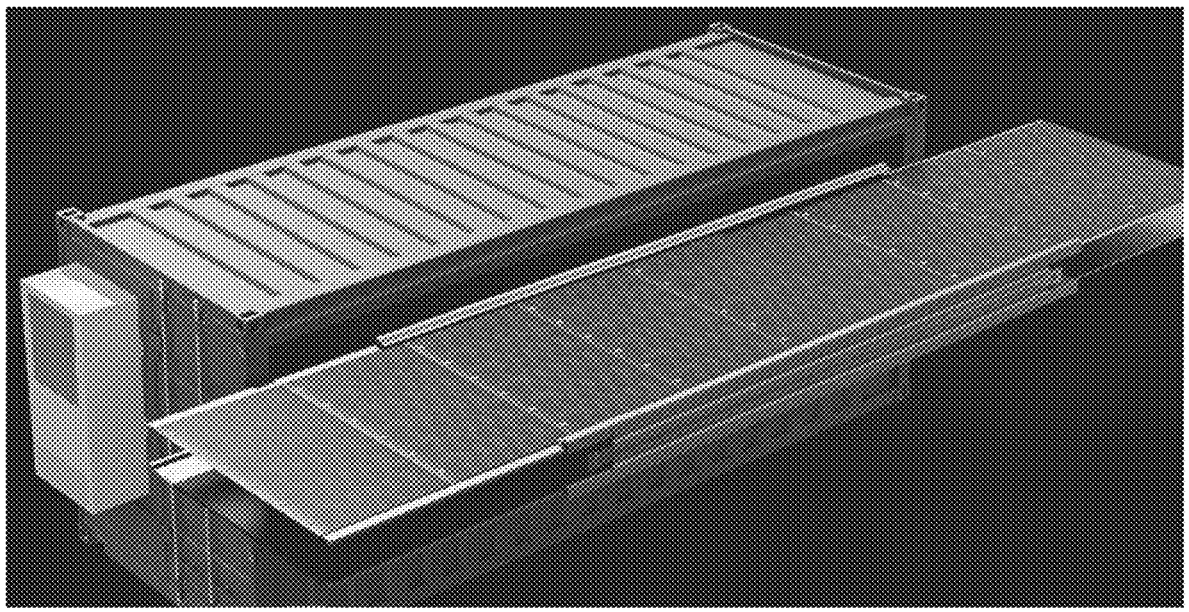
Figure 3:
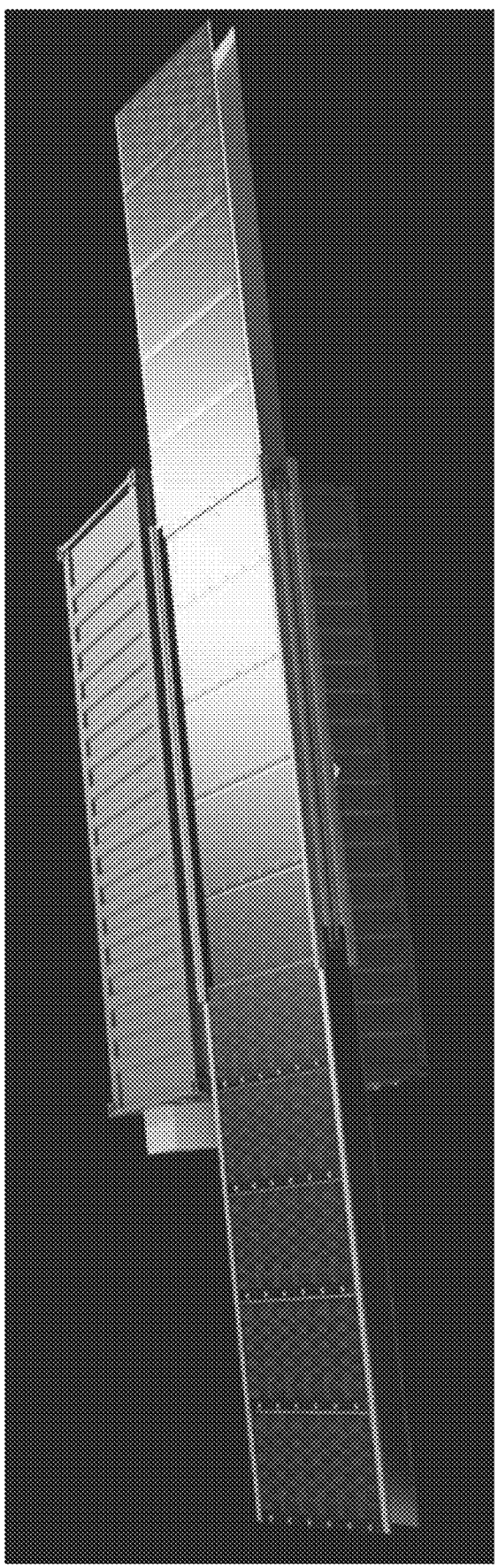
Figure 4:
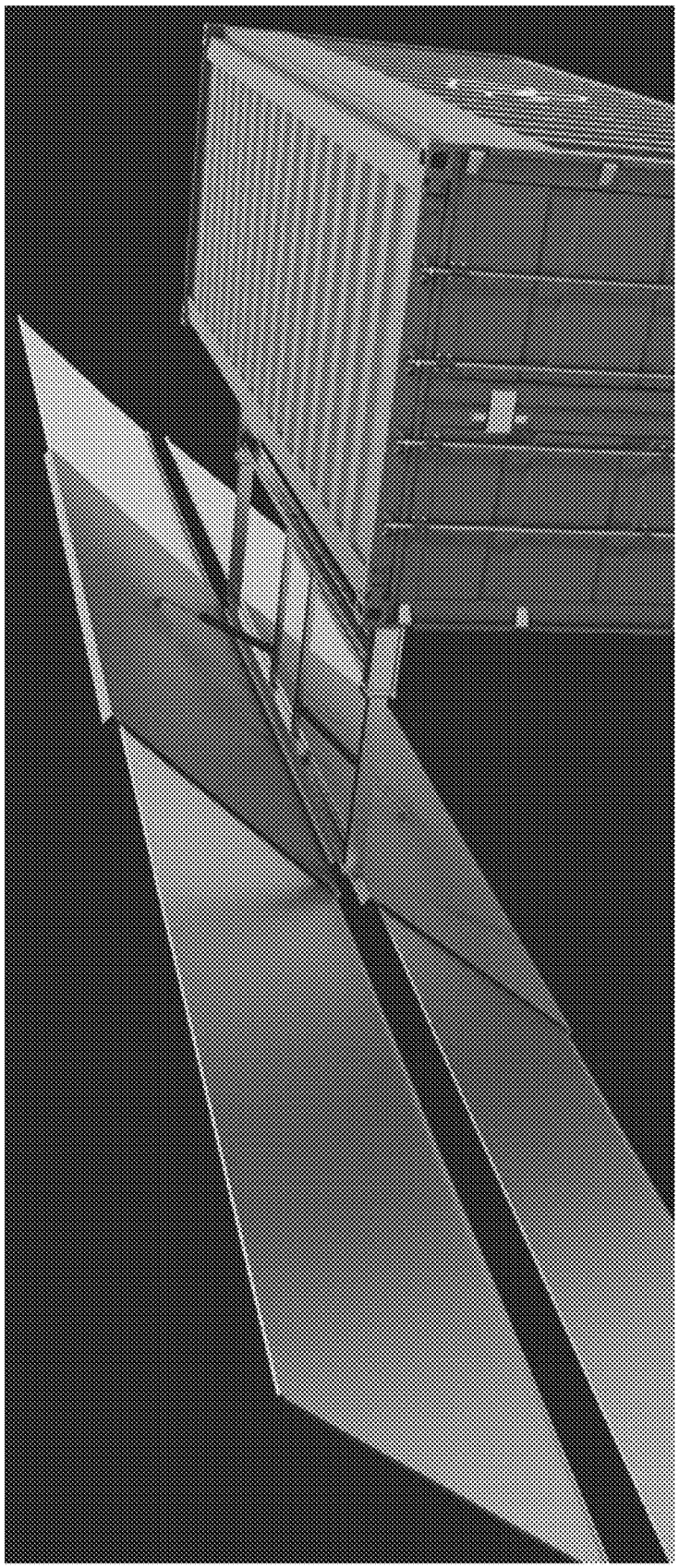
Figure 5:
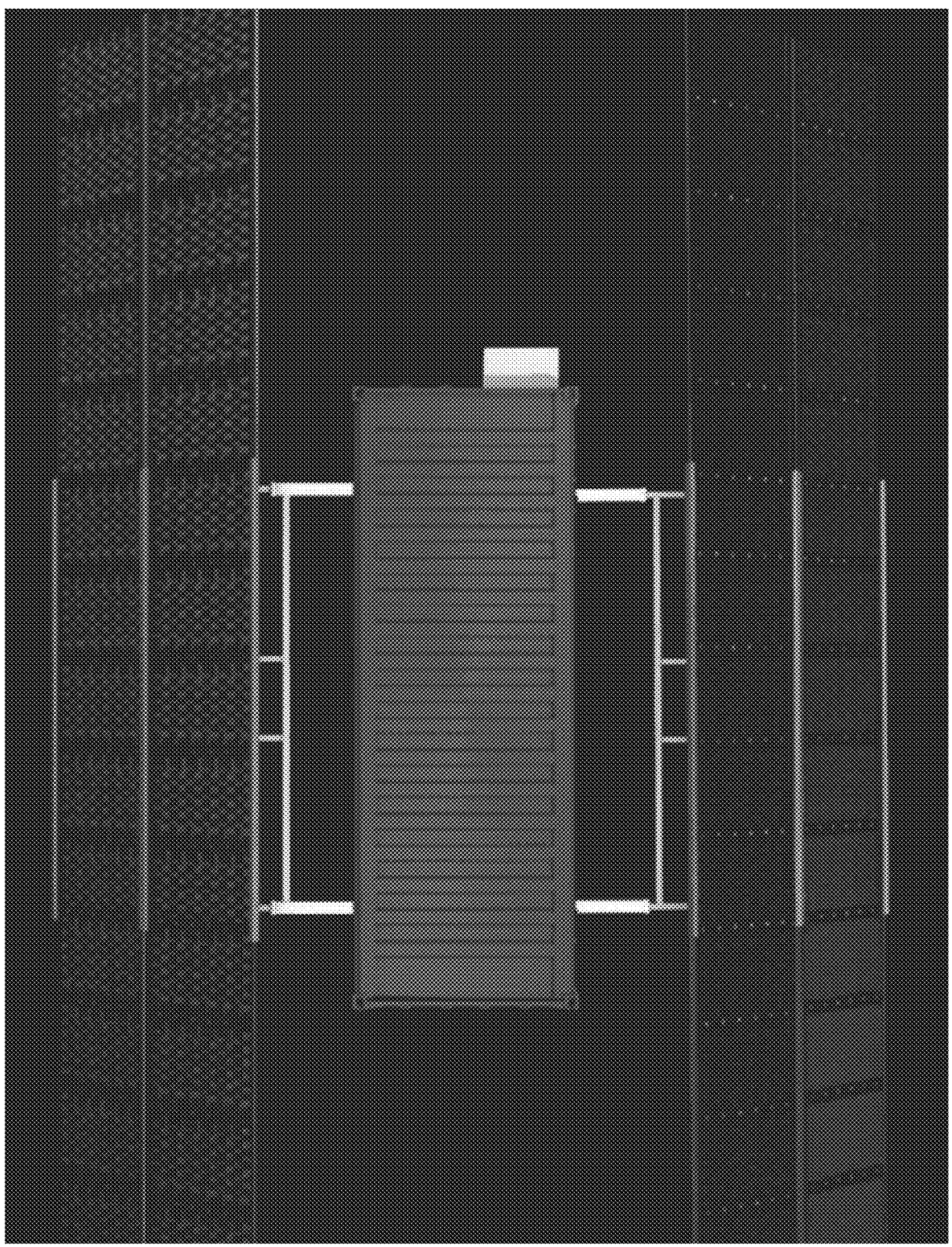
Figure 6:
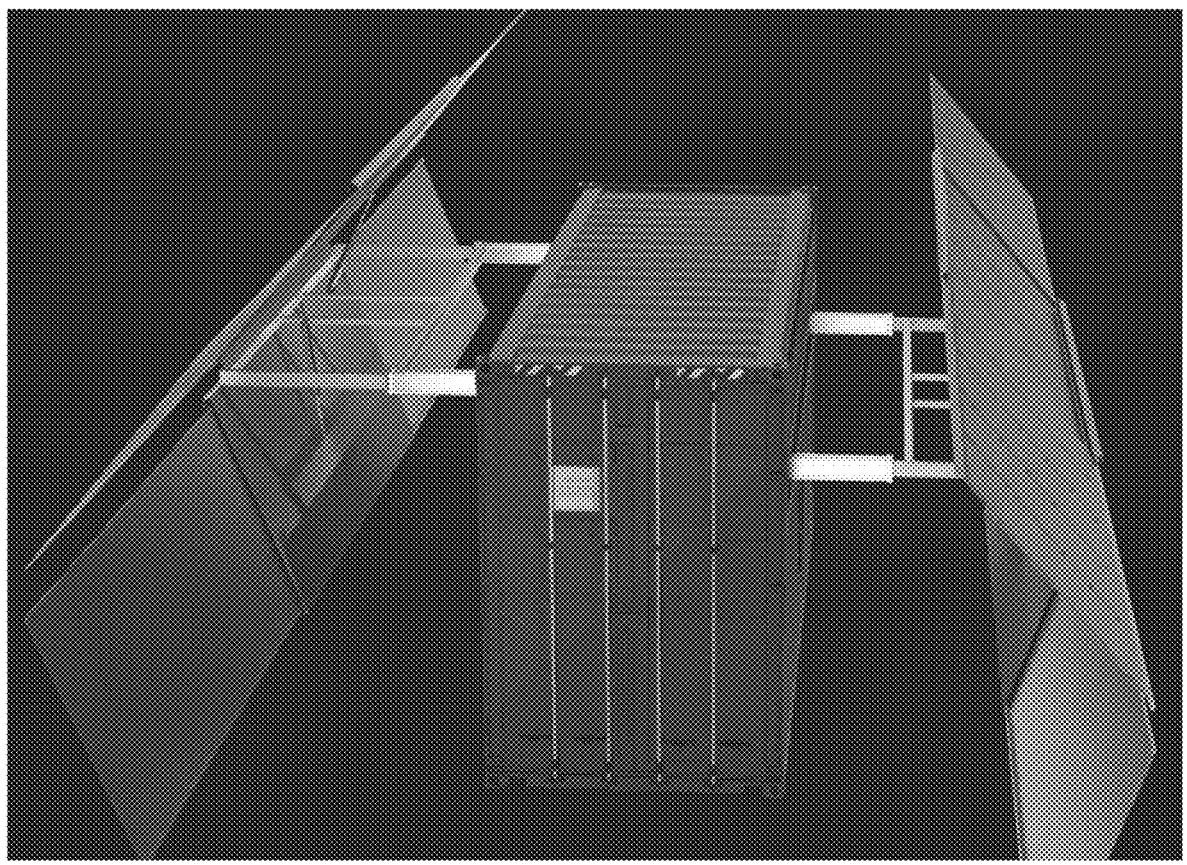
Figure 7:
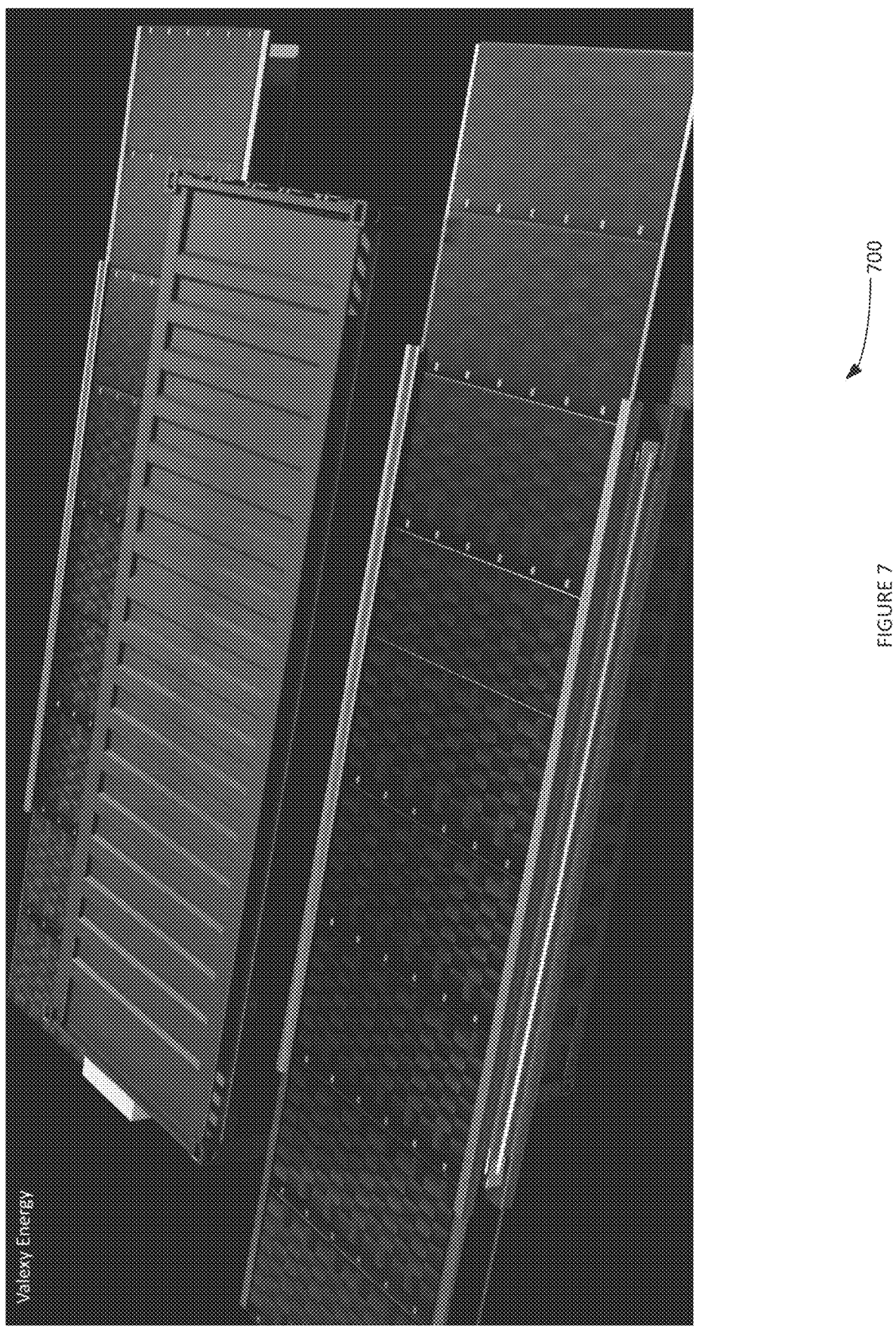
Figure 8:
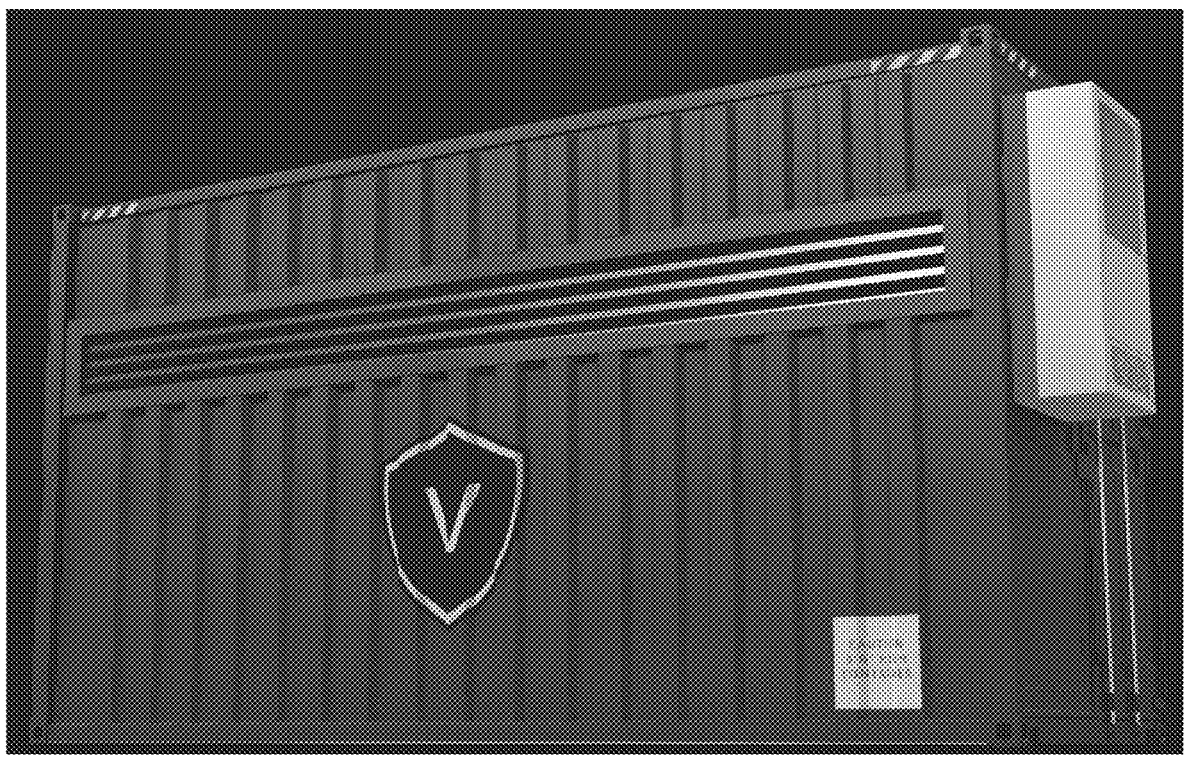

The Figures described above are a representative set and are not an exhaustive set with respect to embodying the invention.

DESCRIPTION

Disclosed are a system, method, and article of manufacture of a container unit with rapidly deployable integrated retractable photovoltaic solar panels, batteries, controller, and energy yield management software. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

National Renewable Energy Laboratory (NREL) specializes in the research and development of renewable energy, energy efficiency, energy systems integration, and sustainable transportation.

Photovoltaics (PV) is the conversion of light into electricity using semiconducting materials that exhibit the photovoltaic effect.

Pitch axis (or transverse or lateral axis) has its origin at the center of gravity and is directed to the right, parallel to a line drawn from wingtip to wingtip. Motion about this axis is called pitch.

Roll axis (or longitudinal axis) has its origin at the center of gravity and is directed forward, parallel to the fuselage reference line. Motion about this axis is called roll.

Supervisory control and data acquisition (SCADA) is a control system architecture comprising computers, networked data communications and graphical user interfaces for high-level supervision of machines and processes. SCADA also covers sensors and other devices, such as programmable logic controllers, which interface with process plants or machinery.

Yaw rotation is a movement around the yaw axis of a rigid body that changes the direction it is pointing, to the left or right of its direction of motion.

Example System

FIGS. 1-8 illustrates an example solar panel container unit 900, according to some embodiments. Solar panel container unit 900 can be a container unit with rapidly deployable integrated retractable photovoltaic solar panels, batteries, controller, and energy yield management software. Solar panel container unit 900 can be deployed in a sequence illustrated by images 100-800. Images 100-400 illustrate example deployments of a single sided solar panel container unit 900 embodiment. Images 500-800 illustrate example deployments of a two-sided array solar panel container unit 900.

In an example embodiment, solar panel container unit 900 can include/be, inter alia: solar panels, weatherized system and resilient components, grid connectable, also operates Off-Grid System, arrives Ready-to-Operate, can be securely managed from remote location, bi-directional flow of energy, high density battery storage, etc. Solar panel container unit 900 can include Lithium-Ion Batteries in some examples. Solar panel container unit 900 can include an intelligent controller 908 that manages, inter alia: a dispatchable energy sun tracking system, an energy yield management software, various telemetry data driven systems/actions, etc. Controller 908 can include intelligent SCADA hardware with embedded software device, which continuously acquires, measures, monitors, stores and analyzes data enabling the solar panel container unit 900 to make AI-based decisions.

Solar panel container unit 900 can include proximity sensors and/or other sensor systems (e.g. temperature, vibration, water, wind sensors, etc.). Solar panel container unit 900 can include an integrated physical security system, air gapped cyber security system, etc. Solar panel container unit 900 can include an Over-the-Air (OTA) upgradable system(s). Solar panel container unit 900 can integrate to supply power to level 3 EV Chargers. Solar panel container unit 900 can be scalable by connecting multiple systems.

Figure 9:
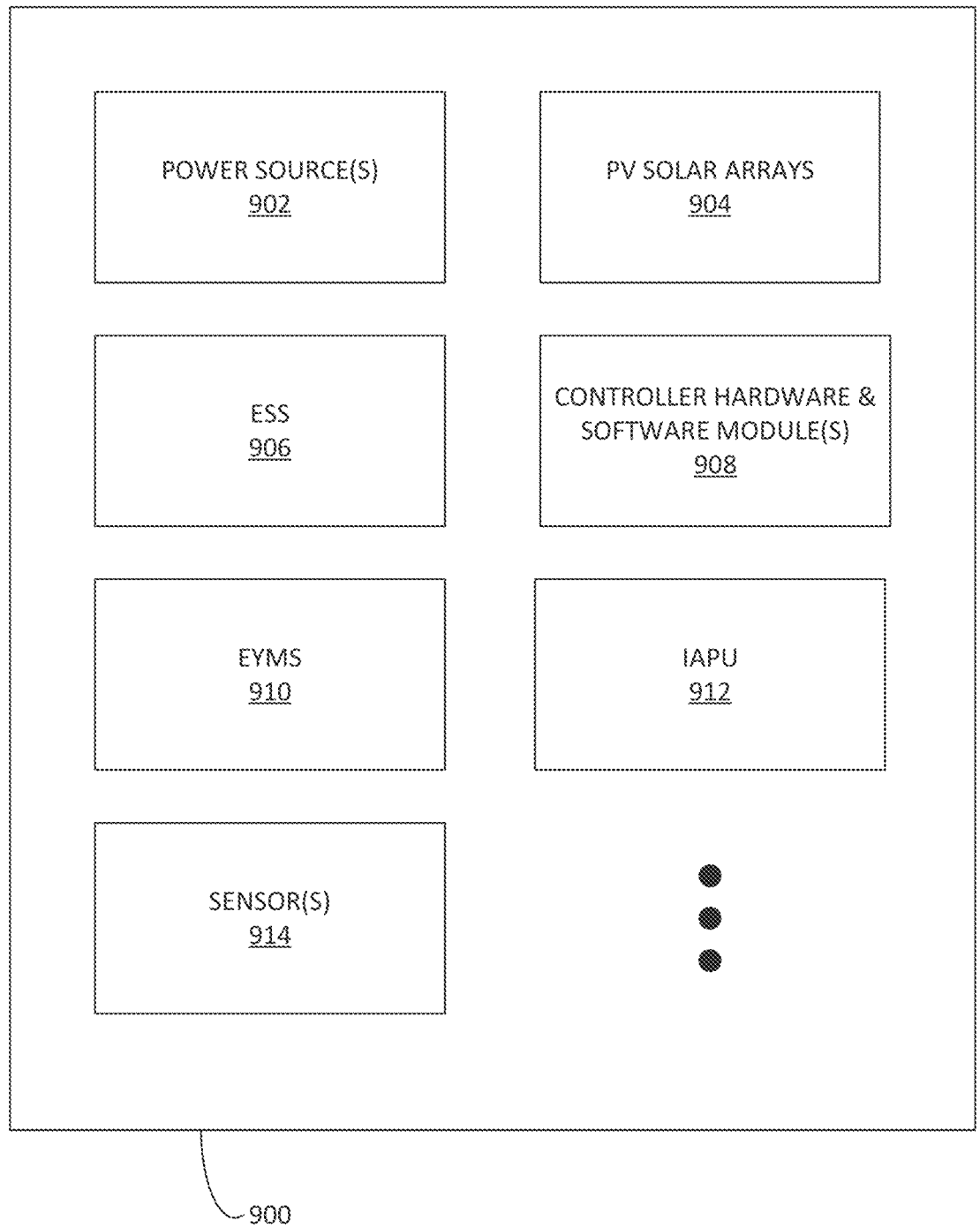
FIG. 9 illustrates a schematic view of a solar panel container unit, according to some embodiments.

FIG. 9 illustrates a schematic view of a solar panel container unit 900, according to some embodiments. Solar panel container unit 900 can be utilized to implement various embodiments of solar power unit 100. Solar panel container unit 900 can be a containerized micro-grid system in a box. Solar panel container unit 900 can be a container with integrated automation, electronics, and weatherization. Solar panel container unit 900 can include, inter alia: power source(s) 902; photovoltaic (PV) solar arrays 904; energy storage system (ESS) 906; controller hardware and software modules 908; energy yield management software (EYMS) 910; etc.

Power source(s) 902 can be used as the primary source of energy for off-grid application. For example, power source(s) 902 can be utilized in remote and difficult to reach locations. When used in off-grid applications, solar panel container unit 900 does not require Grid Interconnection permits. Solar panel container unit 900 can also be connected to the grid (e.g. an electrical grid as a network for delivering electricity), as well as receive energy from the grid (e.g. can be bi-directional, etc.). In this way, emergency power solar panel container unit 900 can replace diesel generators currently being used for emergency power or auxiliary power. In an augmenting power mode, an external diesel generator can be connected to solar panel container unit 900, such that it charges the battery system (e.g. ESS 906) within the solar panel container unit 900. In this way, solar panel container unit 900 augments a diesel generator's capabilities.

Solar panel container unit 900 can include a protective rolling door to cover the Arrays. These doors are designed to lock in place, and prevent both inclement weather from entering the container, as well as vandalism of the solar panels.

PV solar arrays 904 comprise a photovoltaic solar panel. The PV solar panel can be comprised of a number of solar cells, which generate electric power. PV solar arrays 904 can be ultra-thin and have no metal frame and/or no protective glass. It is this thinness which makes it possible to stack and store multiple sections one above another, all within the physical container portion of solar panel container unit 900.

It is noted that 'ultra-thin' can be less than 5 mm, (e.g. 3.2 mm) for the panel itself. This does not include the junction box attached to the panel which has a thickness less than 25 mm. The total can be approximately 30 mm in height (e.g. just over an inch).

These panels are ultra-lightweight due to the absence of glass and metal. This can allow the actuators to easily lift each section, and sliders to move each section horizontally. The solar panels are encapsulated. This can prevent electrical short circuits inside a panel since water is unable leak under the protective surface.

In addition to being resilient to Category 5 hurricanes, Solar panel container unit 900 can be resilient to water, impact of debris, vibration caused by high-speed winds, and/or large temperature fluctuations between −70 C and +85 C.

Figure 10:
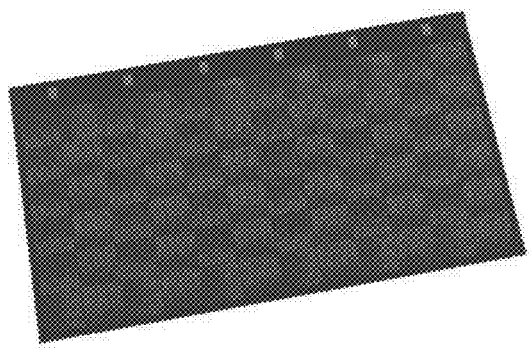
FIG. 10 illustrates an example solar panel, according to some embodiments.

FIG. 10 illustrates an example solar panel 1000, according to some embodiments. Solar panel 1000 can be a 72-cell PV Solar Panel (e.g. 6×12 cells).

In some examples, PV solar arrays 904 can include multiple sizes of panels. These can range, for example, from 24 cells (2×12) up to 72 cells (6×12). These multiple sizes of panels allow the flexibility to change the amount of solar that can be included in a system. PV solar arrays 904 can be lead-free panels. PV solar arrays 904 can be made using a lead-free process and is therefore RoHS compliant.

Multiple solar panels can be mounted using a peel and stick method onto a hard surface (e.g. metal, creates a section of PV solar (i.e. a "section")). This enables the panels to lie flat. In some embodiments, five to thirty-six solar panels can make up a section.

Figure 11:
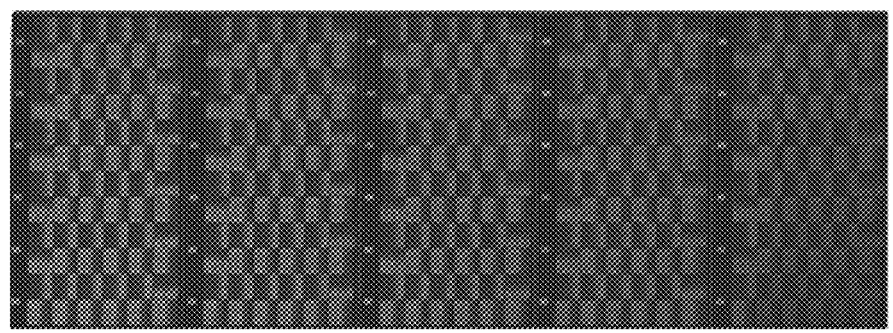
FIG. 11 illustrates an example Section of five 72-cell solar panels, according to some embodiments.

FIG. 11 illustrates an example Section of five 72-cell solar panels 1100, according to some embodiments.

The PV Solar panels are oriented in portrait or landscape on the section, depending on the design of the solar panels, to optimize the number of solar panels in a Section. This impacts the number of solar cells, and therefore the amount of energy the system can produce. Each solar panel has one or more junction boxes ("J-Box"). There can be between two to eight J-Boxes per panel. The J-Boxes located at each end have cables with connectors. One end has a male connector, and the other a female connector, so they can connect to the next panel. The J-Boxes can be located underneath the solar panel, or on top of the solar panel, as needed.

By plugging in the connectors to each other, panels across a section are connected in series or in parallel. The electrical portion of the connected panels in a section are referred to as a string. Strings are connected to the ESS 906 to ensure the safety and optimum functioning of the system.

ESS 906 stores electrical energy in its batteries. ESS 906 includes a software Battery Management System (BMS) which ensures the batteries perform optimally by regulating the charging and discharging cycles. The BMS is supervised by a separate Controller (of Controller, Hardware, and Software modules 908) and its software, to either dispatch energy when needed, or receive and store energy in the ESS 906. ESS 906 can receive its energy from, inter alia, six sources:

(1) Solar panels integrated in solar panel container unit 900;
(2) External solar panels (e.g., roof top or ground mount solar);
(3) From another solar panel container unit 900 system and/or another ESS 906 which are connected to create a scalable system;
(4) When solar panel container unit 900 is connected to the Grid, energy received from the Grid;
(5) When solar panel container unit 900 is connected to EV Charging Stations, and used in the bi-directional mode, energy received from EVs via their EV Charging station; and/or
(6) When connected to an external diesel generator.

Solar panel container unit 900 can include an Energy Yield Management Software (EYMS) 910. EYMS 910 includes various advanced algorithms to decide when energy are to be dispatched, when it should be stored, and when it should receive energy to be stored. The algorithms take into account local pricing from the utility which often are based upon time-of-use, seasonality, demand load pricing and related peak load shaving, among other factors.

Solar panel container unit 900 can be deployed as a permanent emergency or auxiliary power solution (e.g., fire station, etc.). Solar panel container unit 900 can be deployed as soon as it is in place. Solar panel container unit 900 is configured to retract the solar array inside the safety of the box, automatically using telemetry data, and/or upon command, to avoid inclement weather or for reasons such as security. Solar panel container unit 900 is easily transported on regular trailers, temporarily deployed on goose neck trailers coupled with Level 3 EV Chargers and is compact enough to be transported using cargo helicopters for difficult to reach locations.

Figure 12:
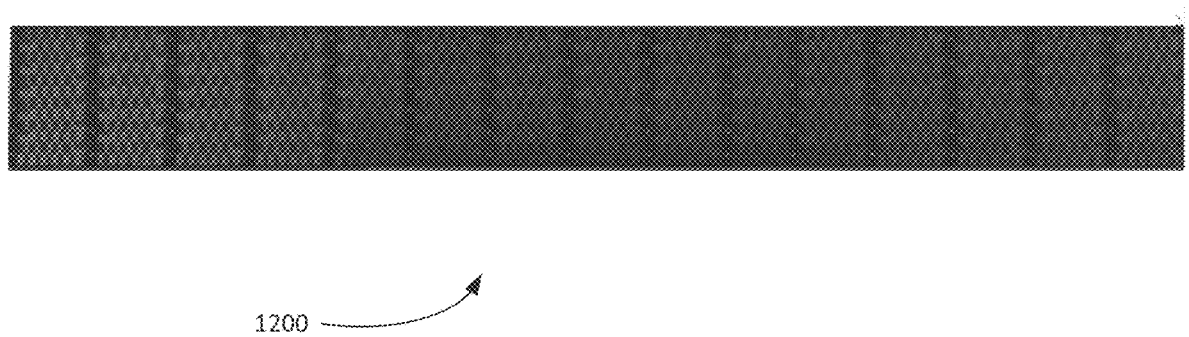
FIG. 12 illustrates an example PV solar array, according to some embodiment.

FIG. 12 illustrates an example PV solar array ("array") 1200, according to some embodiment. In the present example, PV solar array 1200 includes three sections. PV solar array 1200 can include multiple sections that are connected together to form PV solar array 1200. In some examples, there can be between one and five sections in PV solar array 1200. In other examples, PV solar array 1200 can have a minimum of one (1) array and can include up to thirty (30) arrays. These quantities are provided by way of example and not of limitation. Other examples can include n-number of sections and/or arrays.

Solar panel container unit 900 can include an Independent Auxiliary Power Unit (IAPU) 912. IAPU 912 power the automation for the deployment and retraction of arrays 1200-1300. In this way, solar panel container unit 900 can operate, and is not impacted by the level of energy available in the ESS 906 which is designed to support the micro-grid system. Arrays 1200-1300 can first recharge IAPU 912 and only then they recharge the ESS 906. Accordingly, there is power available to deploy and/or retract the arrays 1200-1300. It is noted that arrays 1200-1300 may first recharge the IAPU 912 and only then they recharge the ESS 906. This can ensure that there is power available to deploy or retract arrays 1200-1300.

Figure 13:
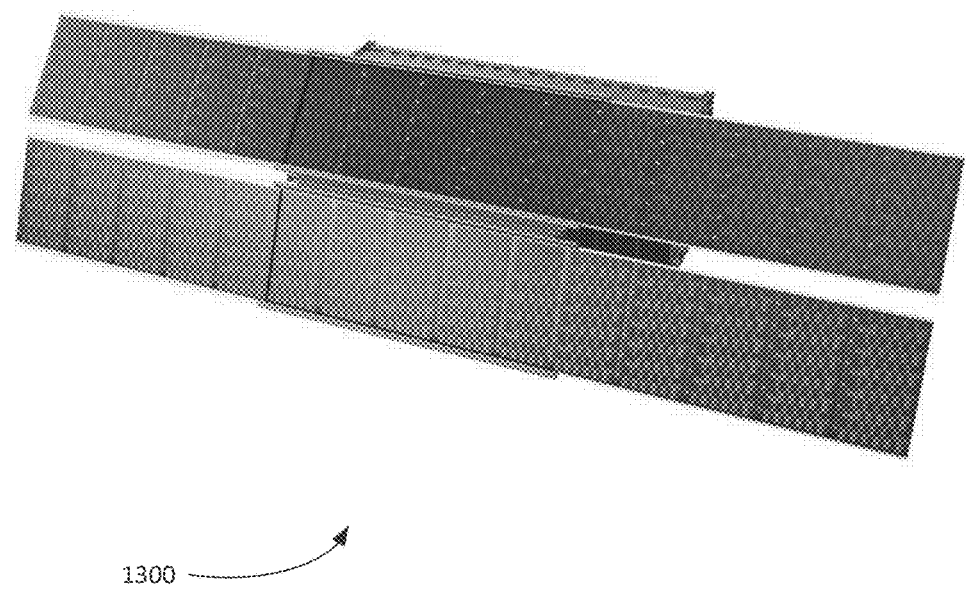
FIG. 13 illustrates an example of a dual-array PV solar array system, according to some embodiments.

FIG. 13 illustrates an example of a dual-array PV solar array system 1300, according to some embodiments. As noted in FIGS. 1-4, solar panel container unit 900 can have all its arrays on one side of the container as shown in FIG. 13, or it can have Arrays on both sides of the container. Arrays 1200-1300 can be deployed alongside the longest part of the container (e.g. the length of solar panel container unit 900).

It is noted that, in some examples, a tri-array can be on a single side. This can be part of a hexad array (total of six arrays) system when using both sides. The third array can be above the dual array (e.g. when it is extended, the motion is to move the third array above the dual array).

Solar panel container unit 900 can manage the deployment and retraction of arrays 1200-1300. Arrays 1200-1300 can be partially or fully deployed and are also retracted using one of four modes of operation. These four modes of operations include, inter alia:

(1) A pre-programmed electronic command, which can be based on a set of conditions using time of day (e.g., pre-programmed times, etc.);
(2) Telemetry data e.g., sunrise and sunset times, inclement data to avoid any damage due to water, wind, snow, hail, etc.;
(3) Manually initiated electronic command; and
(4) Arrays 1200-1300 can also be deployed and retracted using a manual mechanical winch, which is included as a fail-safe mechanism in the event of complete loss of power.

Solar panel container unit 900 can manage the selectively configured deployment of arrays 1200-1300. Arrays 1200-1300 can be deployed in multiple different configurations. Some examples of deployment are:

(1) Only One side of Arrays;
(2) Only Lower Array;
(3) Only Upper Array;
(4) Both sides;
(5) Only one Section of one an array;
(6) Partial Sections with overlapping areas;
(7) Multiple Sections;
(8) One level Telescopic extensions; and
(9) Multiple level Telescopic extensions.

This flexibility for deployment provides solar panel container unit 900 the ability to select what to deploy, as this may be required due to limitations of space around the container, and/or the limitation to deploying the full wing-span of the arrays 1200-1300. Arrays 1200-1300 can also be deployed so as to protect them from various environmental conditions, including, inter alia: wind shear which occurs during high winds; snow on arrays 1200-1300; to help remove snow by pulling arrays 1200-1300 inside the container; and/or other requirements best served by using a different configuration of the arrays 1200-1300.

Solar panel container unit 900 can manage retraction of arrays 1200-1300. Similar to how arrays 1200-1300 are deployed, arrays 1200-1300 can also be retracted selectively, to achieve the various desired configurations.

Arrays 1200-1300 can have debris covers to prevent solar hotspots. Arrays 1200-1300 can have a debris cover both at the top and the bottom of the center section of the top and bottom arrays to prevent solid materials from falling into the slider tracks and thereby clogging up the tracks. The debris covers have been designed to allow the passage of liquids underneath the cover e.g., water, melting snow, and are shaped with an angled front edge close to the PV solar panels surface. However, the debris covers force solid objects such as leaves, twigs and tree branches, to be swept over the angular edge of the debris cover and off arrays 1200-1300. This prevents any covering of the solar array and prevents the otherwise common problem of creating hotspots on the solar array due to one or more cells being covered. Multiple hotspots over time can greatly diminish the performance and energy production capability of the solar arrays.

Figure 14:
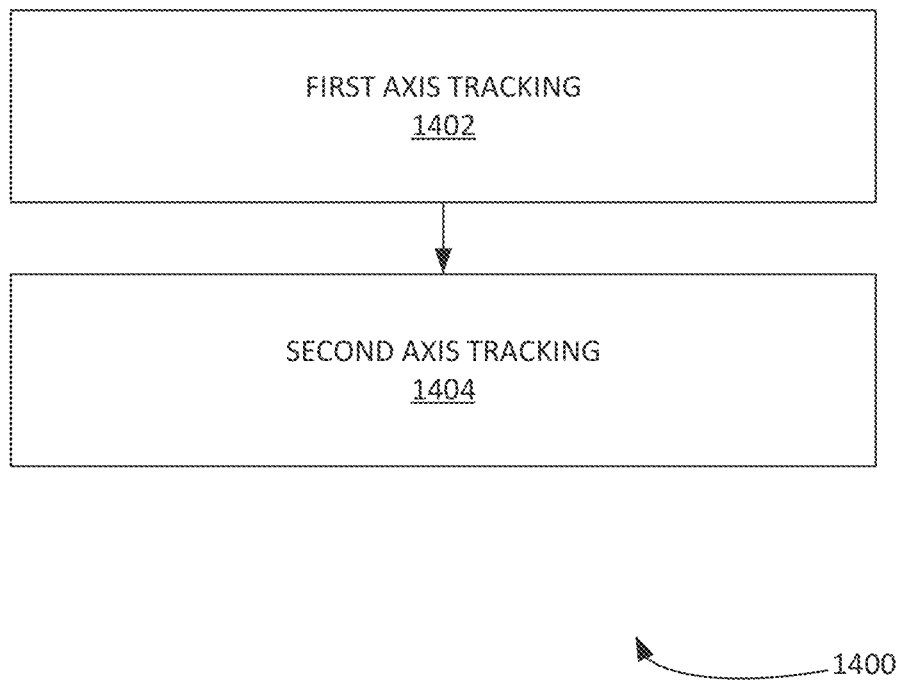
FIG. 14 illustrates an example array tracking process, according to some embodiments.
Figure 15:
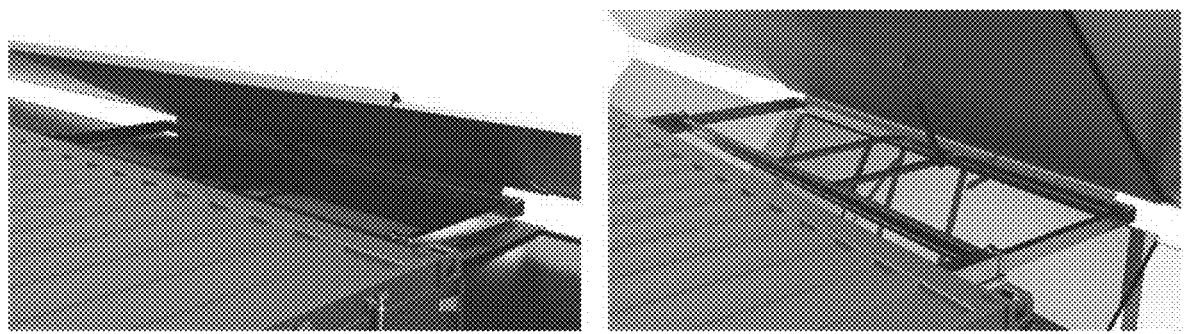
FIG. 15 illustrates an example of arrays tracking the Sun, according to some embodiments.

FIG. 14 illustrates an example array tracking process 1400, according to some embodiments. It is noted that the Solar panel container unit 900 can track the Sun to help optimize the amount of energy production. Solar panel container unit 900 has six degrees of freedom for the system: X, Y, Z, Yaw, Pitch and Roll. FIG. 15 illustrates an example of arrays tracking the Sun, according to some embodiments.

In step 1402, process 1400 can implement first axis tracking. The first tracking axis is along the pitch of arrays 1200-1300, going from horizontal to upright and back.

In step 1404, process 1400 can implement second axis tracking. The second tracking axis is along the yaw of the arrays 1200-300. This is when arrays 1200-1300 which come out horizontally along the Z-axis, are set at an angle to yaw around the center z-axis, to the left and the right.

Solar panel container unit 900 can include various sensor(s) 914. Sensor(s) 914 can include proximity sensors. Arrays 1200-1300 can have proximity sensors on their edges. These sensors can sense obstructions and then automatically stop the telescoping extension procedure during deployment. This prevents any physical damage that could be caused if one or more Arrays run into obstructions. There can be a manual override that can be used by the human operator, in case of sensor failure, sensor misrecognition, and/or need to extend the system manually beyond the sensors parameters.

Sensor(s) 914 can include security sensors and cameras. Solar panel container unit 900 can include multiple security cameras available to help remote monitoring of the perimeter as well as the system itself. Solar panel container unit 900 is designed to be Category 5 Hurricane resilient. Solar panel container unit 900 can have multiple types of sensors to monitor and react to temperature, wind speed, vibration detection, and water levels around the container.

For winterized versions of solar panel container unit 900, heating strips can be installed inside the surface of the container. These strips can melt snow and/or thaw out mechanical parts to assist Solar panel container unit 900 to function in extremely cold climates.

Figure 16:
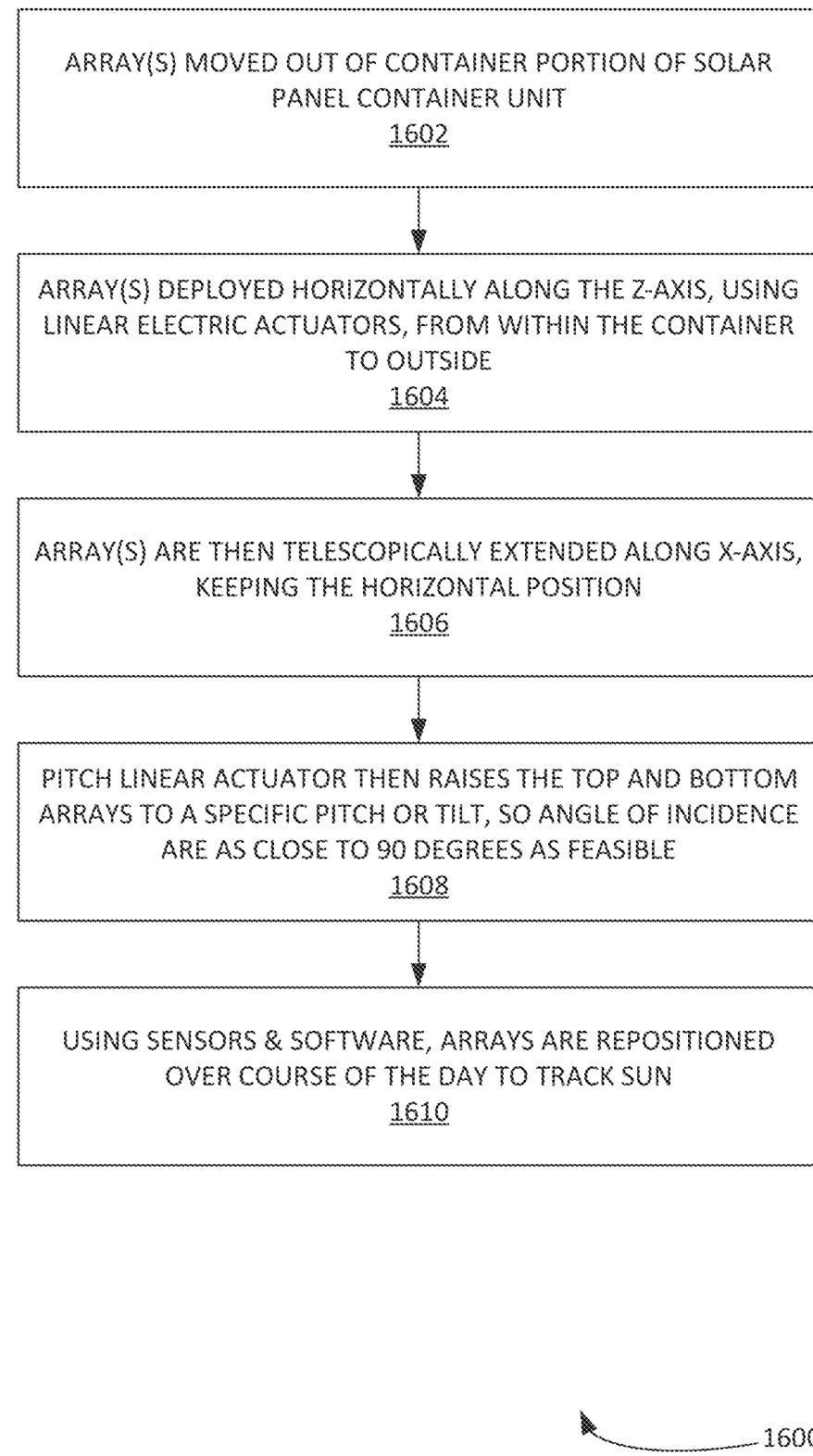
FIG. 16 illustrates an example process for deploying arrays, according to some embodiments.

FIG. 16 illustrates an example process 1600 for deploying arrays, according to some embodiments. In step 1602, solar panel container unit 900 has rolling doors to protect arrays 1200-1300. At time of deployment, the doors open electronically. After the sensors indicate the rolling door is fully open, arrays 1200-1300 can be moved out of the container portion of solar panel container unit 900.

In step 1604, arrays 1200-1300 are arranged and stored horizontally inside the container. The entire stack of arrays 1200-1300 are deployed horizontally along the Z-axis, using linear electric actuators, from within the container to the outside. Moving the stacked arrays 1200-1300 along the Z-axis minimizes the amount of energy used during the deployment stage as potential energy is minimized in this horizontal position.

In step 1606, arrays 1200-1300 are then telescopically extended along the X-axis, keeping the horizontal position. The center section remains stationary, and arrays 1200-1300 above and below the center sections move telescopically outwards, keeping the horizontal position. When the desired position of extension along the X-axis is achieved, the extension stops.

In step 1608, one or more pitch linear actuator(s) then raise the top and bottom arrays 1200-1300 to a specific pitch or tilt, so the angle of incidence between the Sun and arrays 1200-1300 are as close to 90 degrees as feasible, so the panels can capture the maximum amount of sunlight.

In step 1610, using sensors and software, arrays 1200-1300 are repositioned over the course of the day to track the Sun. Retraction of arrays 1200-1300 follow the reverse sequence to deploying arrays 1200-1300.

Configuration of sections of arrays 1200-1300 are now discussed. The sections deployed along the z-axis, and which stays in this center position (e.g. coming out of the container box, etc.) is the center section. The sections that extend themselves telescopically to the left and right of the center section (e.g. along the x-axis, etc.) are called the Left and Right Section. When there are two levels of telescopic extensions along the X-axis, the sections are termed, going left to right, left outer section, left inner section, center section, right inner section, and right outer section. Each section can have a different number of solar panels, and a different size type of solar panel with different power output.

Figure 17:
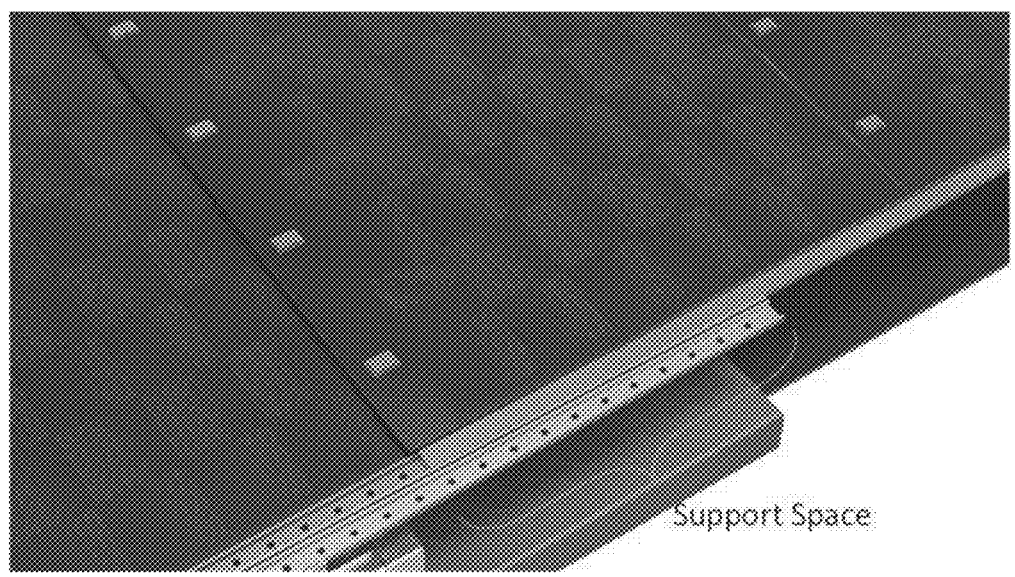
FIG. 17 illustrates an example view of a support space, according to some embodiments.

FIG. 17 illustrates an example view of a support space 1700, according to some embodiments. Some sections can reserve space (e.g. support space 1700) at one or both ends, to allow overlap from the next section. Support space 1700 enables the lower section to provide physical support to the section just above it, where they overlap. This helps provide structural integrity when the sections are telescopically extended.

Figure 18:
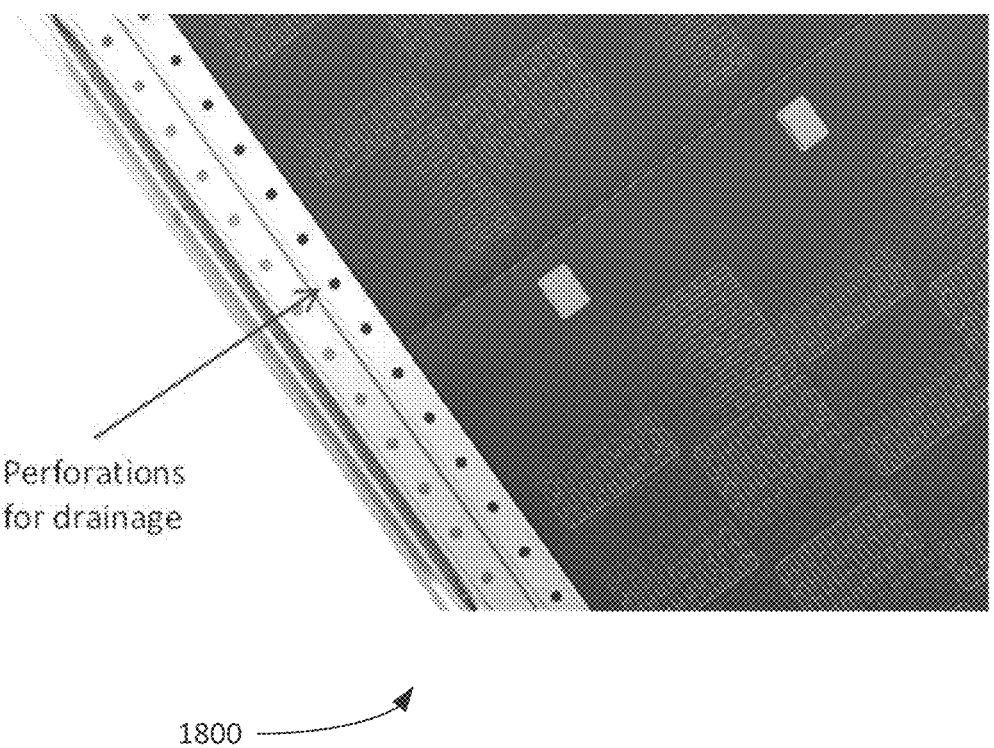
FIG. 18 illustrates example perforated track(s) to facilitate drainage, according to some embodiments.

FIG. 18 illustrates example perforated track(s) 1800 to facilitate drainage, according to some embodiments. Perforated track(s) 1800 can provide drainage for liquids in slider tracks. When rainwater and/or melted snow slides under the debris cover in the center section, it is drained from the tracks because there are perforations in the tracks to facilitate drainage.

Additional embodiments can include the following elements. There can be barn doors style doors opening outwards, on both sides of solar panel container unit 900. This allows direct access from the outside to the battery energy storage systems. This also facilitates easy access for servicing the batteries. It also minimizes OSHA compliance requirements and therefore certification (e.g. since a person doesn't need to step into the container).

Solar panel container unit 900 can include a Kevlar lining and additional steel on the inside of these doors to the container, lining the doors for protection. This can provide an additional layer of protection from high velocity objects (e.g. vandals shoot at them, etc.). The HVAC system can be flush on the outside with a protective cover for transportation and this can be a dual mini-split system in each box. As this is a dual system, it can provide HVAC redundancies. The Energy Storage System (ESS) is designed to be stacked in a rack, and tethered so they cannot fall out of the rack even if the container tips over on its side. The ESS can be in its own compartment. This can enable cooling, security, and compliance reasons for the ESS. In some embodiments, there is an approximately one-foot vertical clearance above the batteries within the ESS compartment to enabling proper air circulation and cooling, thereby preventing the batteries from overheating.

Solar panel container unit 900 can include a second separate compartment, which is completely and securely divided inside the container. This can be reserved for the IAPU and for the power electronics such as Inverters, communications equipment, controller etc. The only access to this compartment can be from the outside. There can also be a wall between the two compartments to prevent any physical human passage.

Additional Example Computing Systems

Figure 19:
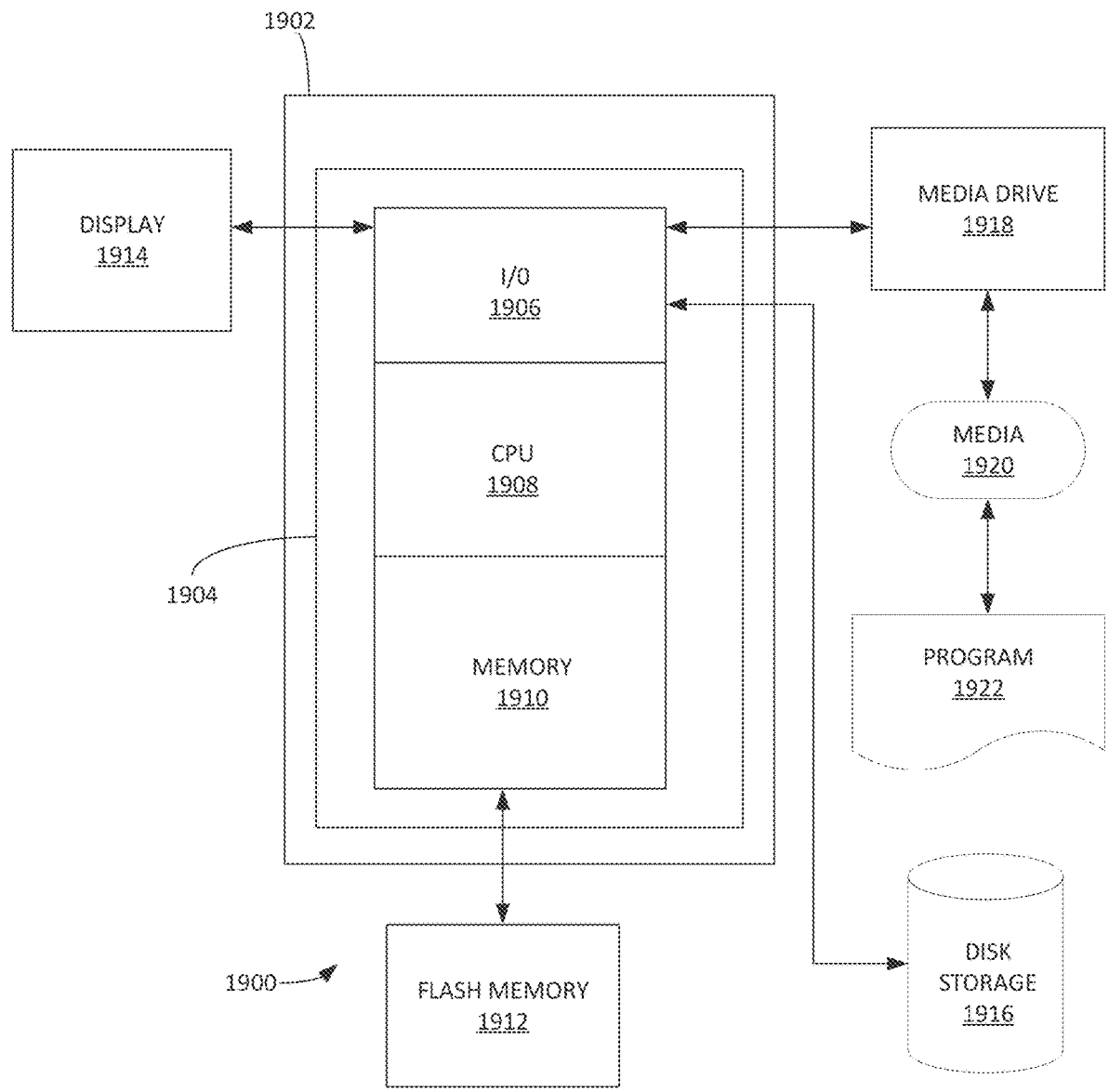
FIG. 19 depicts an exemplary computing system that can be configured to perform any one of the processes provided herein.

FIG. 19 depicts an exemplary computing system 1900 that can be configured to perform any one of the processes provided herein. In this context, computing system 1900 may include, for example, a processor, memory, storage, and I/O devices (e.g., monitor, keyboard, disk drive, Internet connection, etc.). However, computing system 1900 may include circuitry or other specialized hardware for carrying out some or all aspects of the processes. In some operational settings, computing system 1900 may be configured as a system that includes one or more units, each of which is configured to carry out some aspects of the processes either in software, hardware, or some combination thereof.

FIG. 19 depicts computing system 1900 with a number of components that may be used to perform any of the processes described herein. The main system 1902 includes a motherboard 1904 having an I/O section 1906, one or more central processing units (CPU) 1908, and a memory section 1910, which may have a flash memory card 1912 related to it. The I/O section 1906 can be connected to a display 1914, a keyboard and/or other user input (not shown), a disk storage unit 1916, and a media drive unit 1918. The media drive unit 1918 can read/write a computer-readable medium 1920, which can contain programs 1922 and/or data. Computing system 1900 can include a web browser. Moreover, it is noted that computing system 1900 can be configured to include additional systems in order to fulfill various functionalities. In another example, computing system 1900 can be configured as a mobile device and include such systems as may be typically included in a mobile device such as GPS systems, gyroscope, accelerometers, cameras, etc.

Figure 20:
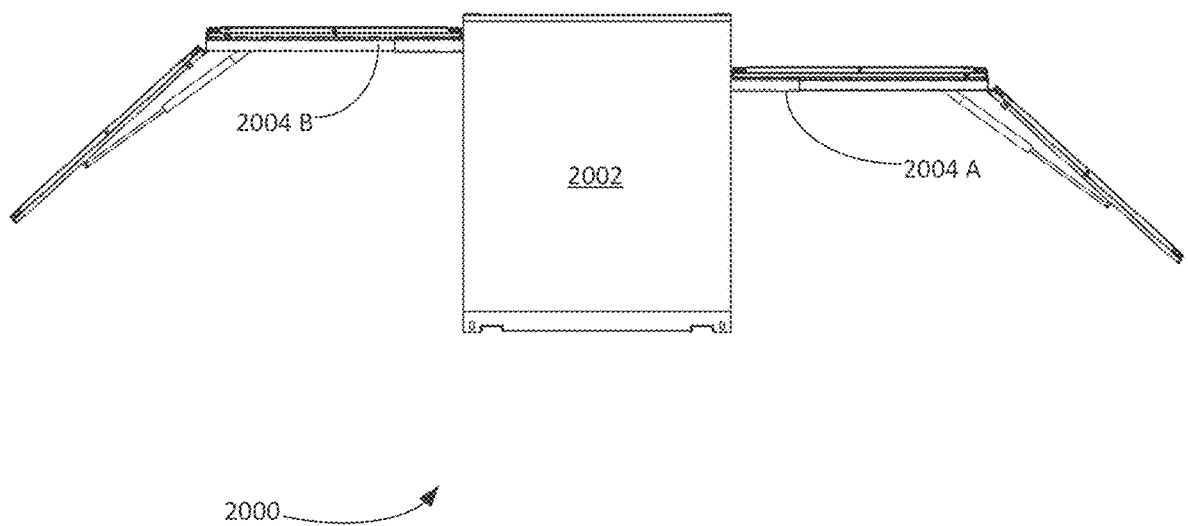
FIG. 20 illustrates an example side view of a portable container unit with retractable photovoltaic solar panels with solar arrays deployed, according to some embodiments.

Solar Axis Tracking System for Portable Container Unit with Retractable Photovoltaic Solar Panels FIG. 20 illustrates an example side view of a portable container unit 2002 with retractable photovoltaic solar panels with solar arrays 2004 A-B deployed, according to some embodiments. Portable container unit 2002 can include a plurality of actuators. The plurality of actuators can be coupled with solar arrays 2004 A-B and used to raise solar arrays 2004 A-B. The initial position can be horizontal or zero degrees (e.g. parallel to the ground). The maximum angle achievable for the Top Array (e.g. 75 degrees) can be lower than the angle for the bottom array which has to travel further out (e.g. 150 degrees).

Portable container unit 2002 can obtain the power to move the actuators from the stored energy in a plurality of auxiliary power unit (APU) batteries. Accordingly, solar arrays 2004 A-B can be moved in increments to optimize energy production as moving the actuators continuously or multiple times in very small increments could drain the APU battery.

Figure 21:
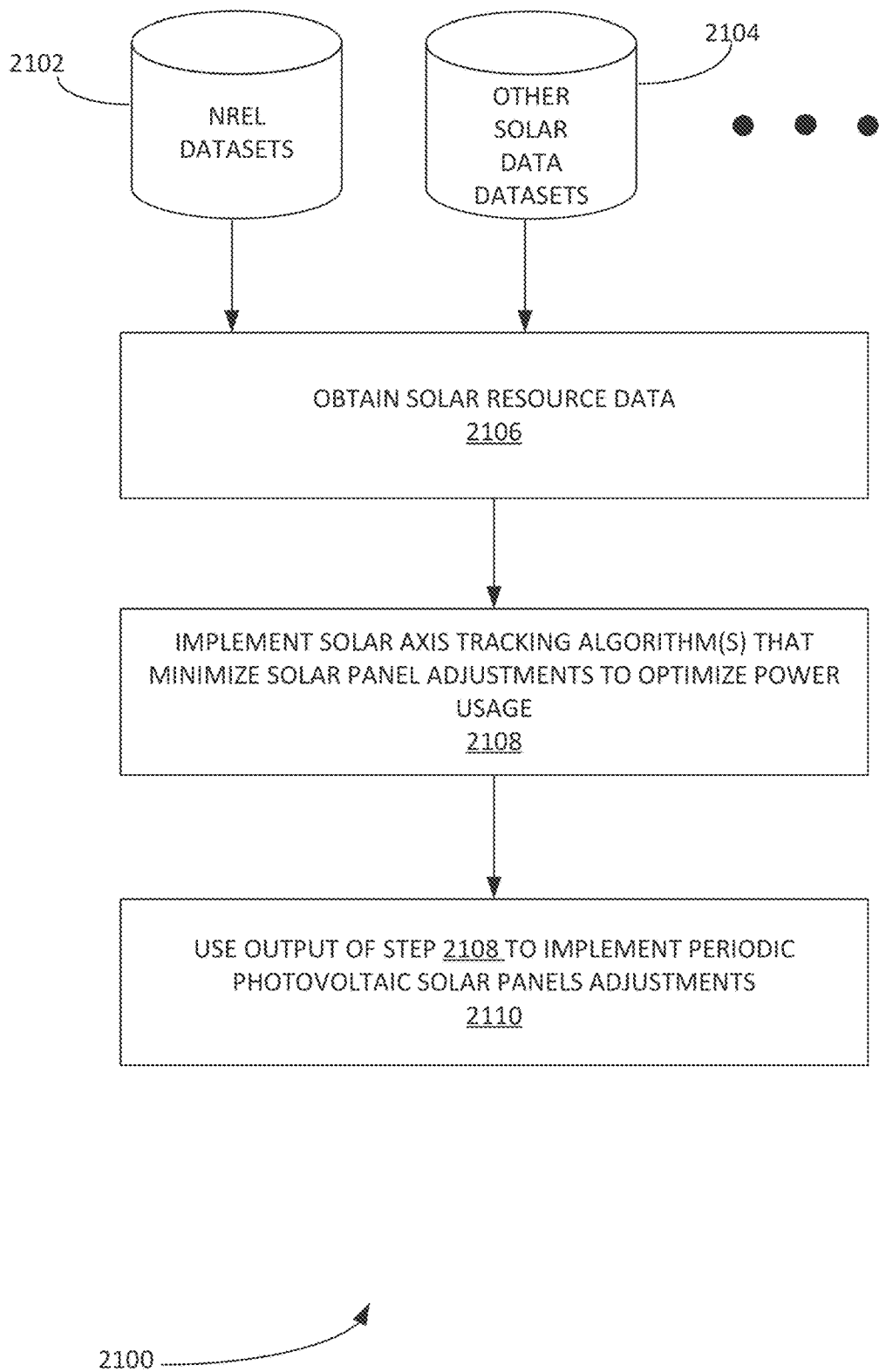
FIG. 21 illustrates an example process for solar axis tracking to optimize energy efficiency, according to some embodiments.

FIG. 21 illustrates an example process 2100 for solar axis tracking to optimize energy efficiency, according to some embodiments.

In step 2106, process 2100 can obtain solar resource data. The solar resource data can be used to optimize solar axis tracking while minimizing local power usage (e.g. as obtained from the auxiliary power unit of portable container unit 2002).

Example solar resource data sets can be obtained from NREL datasets 2102, other solar data sets 2104, etc. NREL datasets 2102 can include Typical Meteorological Year (TMY) data (e.g. as obtained from the National Solar Radiation Database). This data are considered typical because the entirety of the original solar radiation and meteorological data is condensed into one year's worth of the most usual conditions. TMY can be utilized as a median and the methods used to calculate it consider various factors, including solar resource data and weather data such as wind speed and ambient temperature. To calculate a TMY, a multiyear data set is analyzed, and twelve (12) months are chosen from that time frame that best represent the median conditions. For example, a TMY developed from a set of data for the years 1998-2005 might use data from 2000 for January 2003, for February 1999 for March, and so on.

NREL datasets 2102 can include solar resource data and tools to help energy system designers, building architects and engineers, renewable energy analysts, and others accelerate the integration of solar technologies on the grid. NREL datasets 2102 can include a Baseline Measurement System that provided live solar radiation data from approximately 70 instruments on NREL's campus and historical measurements. NREL datasets 2102 can include a Measurement and Instrumentation Data Center that provides irradiance and meteorological data from stations throughout the United States. NREL datasets 2102 can include a National Solar Radiation Database that provides a serially complete collection of meteorological and solar irradiance data sets for the United States and a growing list of international locations. NREL datasets 2102 can include a Bird Clear Sky Model that estimates clear sky direct beam, hemispherical diffuse, and total hemispherical solar radiation for horizontal planes. NREL datasets 2102 can include a Bird Simple Spectral Model that computes clear sky spectral direct beam, hemispherical diffuse, and hemispherical total irradiances on tilted or horizontal planes. NREL datasets 2102 can include a DISC Model that estimates direct beam irradiance from user-supplied hourly average measured global horizontal data. NREL datasets 2102 can include a Simple Model of the Atmospheric Radiative Transfer of Sunshine (SMARTS) that computes clear sky spectral irradiances for a set of user-specified atmospheric conditions. NREL datasets 2102 can include a Solar and Moon Position Algorithm (SAMPA) that calculates the sun and moon position with very low uncertainty based on location, date, and time inputs. NREL datasets 2102 can include a Solar Position Algorithm (SPA) that calculates the solar position with very low uncertainty based on location, date, and time inputs for the years—2000-6000. NREL datasets 2102 can include a Solar Position and Intensity (SOLPOS) that calculates the solar position and intensity based on location, date, and time inputs for the years 1950-2050. NREL datasets 2102 can include a Quality Assessment with QC_TND that performs quality-control checks on the major broadband components of global or total, direct normal, and diffuse radiation. NREL datasets 2102 can include a Quality Assessment with SERI QC that provides a quality-control method for global horizontal, diffuse horizontal, and direct normal solar radiation data. NREL datasets 2102 can include a Solar Resource Glossary that defines solar radiation resource terms found in the data and tools collection.

An example solar resource data set is now discussed. This can include, inter alia: Typical Meteorological Year (TMY) data, a Bird Simple Spectral Model, etc. The example solar resource data set can be used to compute a clear sky spectral direct beam, hemispherical diffuse, and hemispherical total irradiances on a prescribed receiver plane (e.g. tilted or horizontal) at a single point in time. For tilted planes, step 2106 can calculate and optimize the incidence angle of the direct beam or the tilt and azimuth of the plane. The wavelength spacing can be irregular (e.g. covering 122 wavelengths from 305 nm to 4000 nm). In one example, additional information can be obtained/estimated. These include, inter alia: aerosol optical depth, total precipitable water vapor, and equivalent ozone depth. These can be obtained and provided via telemetry and/or pre-downloaded into a local computer system/memory. Additionally, the incoming data can include variations in atmospheric constituents or structure. There can also be a separate computation of circumsolar radiation. The direct beam spectral irradiance can be assumed to contain the circumsolar radiation within a 5° solid angle in one example. Additionally, smoothing functions can be provided.

In step 2108, process 2100 can implement solar axis tracking algorithm(s) that minimize solar array adjustments to optimize power usage. It is noted that optimization of the position of the solar arrays is balanced with the number of increments in the Axis Tracking System description so as to not exhaust the battery to move the solar arrays. In step 2110, process 2100 can use output of step 2108 to implement periodic photovoltaic solar array adjustments.

Figure 22:
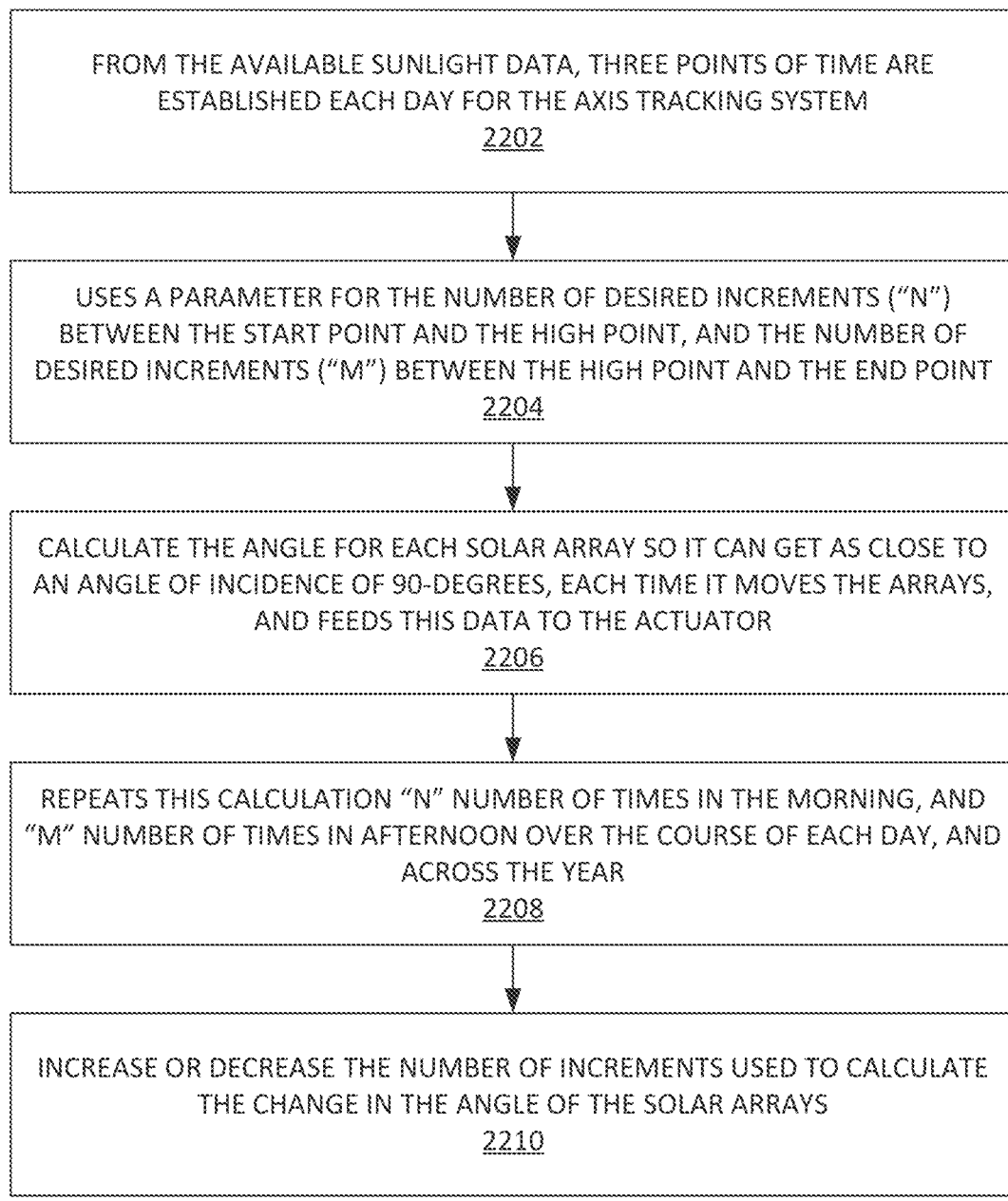
FIG. 22 illustrates another example process for solar axis tracking to optimize energy efficiency, according to some embodiments.

FIG. 22 illustrates another example process 2200 for solar axis tracking to optimize energy efficiency, according to some embodiments. It is noted that process 2200 can be combined with process 2100. Process 2200 can be used to manage the elements of FIG. 20. The energy efficiency that is optimized can be a battery source of a portable container unit as provided supra. It is noted that the portable container unit can include an Axis Tracking System.

In step 2202, from the available sunlight data, three points of time are established each day for the axis tracking system algorithm. These can include, inter alia: Start Point—after sunrise; End Point—before sunset; High Point—when the Sun is at its zenith, typically midday. In step 2204, process 2200 uses a parameter for the number of desired increments ("n") between the Start Point and the High Point, and the number of desired increments ("m") between the High Point and the End Point, which may be the same.

In one embodiment, for a single headed system (e.g. a Top Array and a Bottom Array), the value of this parameter can be different for the Top Array and the Bottom Array. In the northern hemisphere, these arrays can be facing south. In the southern hemisphere, the arrays would typically be facing north.

In addition, when the Portable container unit 2002 is a dual-headed system (i.e., there can be arrays on both sides of the container (e.g. each with a Top and Bottom Solar array)) these values of the number of desired increments can be different for each of the East Facing Arrays and the West Facing Arrays.

In step 2206, process 2200 calculates the angle for each solar array so it can obtain as close to an angle of incidence of 90-degrees, each time it moves the arrays, and feeds this data to the actuator. In step 2208, process 2200 repeats this calculation "n" number of times in the morning, and "m" number of times in afternoon over the course of each day, and across the year.

For example, if n=4, the minimum angle is 0-degrees and the maximum angle is 60-degrees, then the actuator would move the solar array in 15-degree increments.

Since the length of the day of sunshine changes (e.g. as the distance from the equator changes) there is another parameter which can increase or decrease the number of increments used by process 2200 to calculate the change in the angle of the solar arrays in step 2210. For example, when there is twelve (12) hours of sunlight, the value of "n" may be changed from "4" in the previous example, to "6" so the array can be closer to a 90-degree angle of incidence, and thereby optimize energy production.

Since it is possible to physically re-orient the entire system, as the container system does not need to be permanently fixed to the ground, the algorithm also accounts for the alignment of the system towards the Sun, in its calculation for axis tracking.

To maximize the energy production of solar arrays housed inside a standard ISO container, the design requires maximizing the solar array surface area. For example, the number of solar cells that are exposed to sunlight at any given time, and yet all of these arrays can still be retractable into the container for when the system is in the Closed or Protect modes of operation.

The design incorporates motion that moves the array ExoSkeleton in three of the possible six degrees of freedom (X, Y, Z, Pitch, Yaw, and Roll). Z-Axis when the ExoSkeleton is pushed out of the container, X-Axis when the ExoSkeleton extends laterally, parallel to the length of the container, Pitch when the arrays are moved up and down, as described in axis tracking system.

To maximize the solar array surface area that can be exposed to the Sun, is a function of the number of solar cells that can be physically supported by the system and be exposed to the Sun (e.g. considering overlaps, etc.).

An embodiment can include a dual headed system with two arrays on each side, with each array having a total of five telescopic sections: Outer Left, Inner Left, Center, Inner Right and Outer Right. Each section within an array can have a different size as a function of the size of the container unit. An example embodiment is now provided: 10-ft, 20-ft, 40-ft or 53-ft ISO container. Therefore, depending on the size of a section, the number of solar modules that can fit in a section can be different for the Center Section, Inner Section and Outer sections. In addition, the design of the ExoSkeleton, on which the solar modules are fitted and can be exposed to the Sun, can physically support the weight of the modules as well as be resilient to the wind shear effects on the telescopic solar arrays.

The total watts for a system can be calculated as follows:

Total Watts of System=(MOLS+MILS+MCS+ MIRS+MORS)×$A$×$H$×$N$×$W$

Where:
$W$=Watts per solar cell,
$N$=Number of solar cells per module,
MCS=Number of modules center section,
MILS=Number of modules inner left section,
MOLS=Number of modules outer left section,
MOLS=Number of modules inner right section,
MORS=Number of modules outer right section,
$A$=Number of arrays per head, and
$H$=Number of heads.
For example:
$W$=5 Watts per solar cell,
$N$=48 solar cells per module,
MOLS=16 modules in outer left section,
MILS=14 modules in inner left section,
MCS=12 modules in center section,
MIRS=14 modules in inner right section,
MORS=16 modules in outer right section,
$A$=2 arrays per head, and
$H$=2 double headed system.
Then:

Total Watts of System=(16+14+12+14+16)×2×2×48× 5=69,120 Watts.

It is noted that a solar panel container unit can use a retractable protective "rolling door" to shield the solar arrays, and a retractable "protective cover" to shield the HVAC systems during transportation or in Protect mode (e.g. from inclement weather and as an anti-theft device).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:
1. A solar panel container unit comprising:
one or more photovoltaic solar arrays each comprising a photovoltaic solar panel, and wherein the photovoltaic solar panel comprises a plurality of solar cells which generate electric power, wherein each photovoltaic solar arrays of the one or more photovoltaic solar arrays are less than five millimeters (5) mm in thickness and have no metal frames and no protective glass;
a local power source;
a plurality of actuators that move the one or more photovoltaic solar arrays; and
an Axis Tracking System that:
  establishes three points for each day for the axis tracking system algorithm,
  uses a parameter for an n-number of desired increments between a Start Point and a High Point, and an m-number of desired increments between the High Point and an End Point,
  calculates an angle for each solar array so each solar array is as close to an angle of incidence of ninety-degrees (90°) each time the plurality of actuators moves each solar array,
  feeds one or more angle calculations into the plurality of actuators,
  recalculates the one or more angle calculations n-number of times in a morning time, and
  recalculates m-number of times at an afternoon time for each day of operation across an entire year.

2. The solar panel container unit of claim 1, wherein the local power source comprises a battery source.

3. The solar panel container unit of claim 2, wherein the three points of time comprise a Start Point that is after sunrise; an End Point that is before sunset; and a High Point when the Sun is at a zenith.

4. The solar panel container unit of claim 2, wherein the photovoltaic solar arrays comprise a single headed system.

5. The solar panel container unit of claim 4, wherein the single head system comprises a top photovoltaic solar array and a bottom photovoltaic solar array.

6. The solar panel container unit of claim 5, wherein a value of a number of desired increments and the one or more angle calculations is different for the top photovoltaic solar array and the bottom photovoltaic solar array.

7. The solar panel container unit of claim 2, wherein the photovoltaic solar arrays is a dual-headed system.

8. The solar panel container unit of claim 7, wherein the dual-headed system comprises a set of photovoltaic solar arrays on both sides of the solar panel container unit.

9. The solar panel container unit of claim 8, wherein the dual-headed system comprises a top photovoltaic solar array, a bottom photovoltaic solar array, an east facing photovoltaic solar array and a west facing photovoltaic solar array.

10. The solar panel container unit of claim 9, wherein a value of the number of desired increments and the one or more angle calculations is different for each of the east facing photovoltaic solar array and the west facing photovoltaic solar array.

11. The solar panel container unit of claim 10, wherein the one or more PV solar arrays are arranged and stored horizontally inside the solar panel container unit.

12. The solar panel container unit of claim 11, wherein an entire stack of PV solar arrays are deployed horizontally along a Z-axis, using a plurality of linear electric actuators, from within the solar panel container unit to outside of the solar panel container unit.

13. The solar panel container unit of claim 12, wherein the one or more photovoltaic solar arrays are moved along the Z-axis to minimize an amount of energy used during a deployment stage as potential energy is minimized in a horizontal position.

14. The solar panel container unit of claim 13, wherein the one or more photovoltaic solar arrays are then telescopically extended along an X-axis, keeping the horizontal position.

15. The solar panel container unit of claim 14, wherein a center section of the one or more photovoltaic solar arrays remains stationary, and a set of remaining arrays above and below the center section move telescopically outwards, keeping the horizontal position.

16. The solar panel container unit of claim 14, wherein when a desired position of extension along the X-axis is achieved, an extension motion is ceased.

17. The solar panel container unit of claim 1 further comprising:
  a junction box attached to a photovoltaic solar array panel with a thickness less of than twenty-five (25) mm.

18. The solar panel container unit of claim 17, wherein the solar panel container unit comprises a retractable protective rolling door that shields the one or more photovoltaic solar arrays.

19. The solar panel container unit of claim 17, wherein the solar panel container unit comprises a retractable protective cover that shields a Heating, ventilation, and air conditioning (HVAC) system during transportation or in a protect mode.

* * * * *